United States Patent
Vetter et al.

(10) Patent No.: US 10,249,075 B2
(45) Date of Patent: Apr. 2, 2019

(54) PRESAMPLED PHOTON MAPS FOR MONTE-CARLO VOLUME RENDERINGS

(71) Applicant: Siemens Healthcare GmbH, Erlangen (DE)

(72) Inventors: Christoph Vetter, Hopewell, NJ (US); Kaloian Petkov, Lawrenceville, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 166 days.

(21) Appl. No.: 15/172,915

(22) Filed: Jun. 3, 2016

(65) Prior Publication Data
US 2017/0352181 A1    Dec. 7, 2017

(51) Int. Cl.
*G06T 15/06*      (2011.01)
*G06T 15/08*      (2011.01)
*G06T 17/00*      (2006.01)

(52) U.S. Cl.
CPC .............. *G06T 15/08* (2013.01); *G06T 15/06* (2013.01); *G06T 17/005* (2013.01)

(58) Field of Classification Search
CPC ...................................................... G06T 15/06
USPC ........................................................ 345/426
See application file for complete search history.

(56) References Cited

U.S. PATENT DOCUMENTS 8,207,968 B1 * 6/2012 Krishnaswamy ....... G06T 15/50
345/419

OTHER PUBLICATIONS

Global illumination using photon maps. In Proceedings of the eurographics workshop on Rendering techniques '96, Xavier Pueyo and Peter Schroder (Eds.). Springer-Verlag, London, UK, UK, 21-30.*
H. Qu and A. E. Kaufman, "O-buffer: a framework for sample-based graphics," in IEEE Transactions on Visualization and Computer Graphics, vol. 10, No. 4, pp. 410-421, Jul.-Aug. 2004.*
Christensen, P. (1999). Faster Photon Map Global Illumination. Journal of Graphics Tools.*
Christensen, P. Jensen, H, Suykens, F. A practical guide to global illumination using photon mapping. ACM SIGGRAPH 2001 Course Notes 38. Aug. 2001.*
Christensen, N et al. "A Practical Guide to Global Illumination using Photon Maps" Siggraph 2000 Course 8 Jul. 23, 2000 (Jul. 23, 2000), pp. FP-77, XP002773890.
Extended European Search Report dated Oct. 6, 2017 in corresponding EP Application No. 17173613.5.
Jensen, Henrik Wann. "Global illumination using photon maps." Rendering Techniques' 96. Springer Vienna, 1996. 21-30.
Qu, Huamin, et al. "A framework for sample-based rendering with O-buffers." Proceedings of the 14th IEEE Visualization 2003 (VIS'03). IEEE Computer Society, 2003.

\* cited by examiner

*Primary Examiner* — Shivang I Patel

(57) ABSTRACT

The present embodiments relate to presampled photon maps for Monte-Carlo volume renderings. A photon map is generated from scan data of a volume, and the photon map is sampled and stored as an O-buffer or a uniform buffer. The O-buffer is adapted to the scan data and/or the transfer function to optimize the offset of the O-buffer for use in Monte-Carlo volume rendering. A Monte-Carlo volume rendering is generated from the scan data and the sampled photon map.

18 Claims, 5 Drawing Sheets

PRESAMPLED PHOTON MAPS FOR MONTE-CARLO VOLUME RENDERINGS

BACKGROUND

Highly realistic or "cinematic" quality volume renderings are based on stochastic Monte-Carlo path tracing techniques. Monte-Carlo path tracing samples a large number of rays of light traveling through the volume to generate a realistic rendered image. Many of the sampled rays do not hit the light source, thus do not ultimately contribute to the rendered image. Bi-directional ray tracing or photon mapping is introduced to sample the rays that do not hit the light source. However, bidirectional ray tracing and photon map rendering methods significantly increase the computational costs of rendering the image.

Photon mapping is a two-pass rendering method for generating accurate and realistic images. The first pass of the photon mapping approach is performed by shooting energy as photons from the light source into the volume, and when these photons hit surfaces of the volume, the photon characteristics are stored as a photon map in a balanced k-dimensional tree (KD-tree). In the second pass of the photon mapping approach, the stored photon characteristics are sampled for rendering an image. Photon maps are stored view-independent, allowing for rendering from any viewpoint or perspective of the volume.

SUMMARY

The present embodiments relate to presampled photon maps for Monte-Carlo volume renderings. By way of introduction, the present embodiments described below include apparatuses and methods for sampling photon maps for Monte-Carlo volume renderings. The present embodiments also include apparatuses and methods for generating Monte-Carlo volume renderings using presampled photon maps. A photon map is generated from scan data of a volume, and the photon map is sampled (e.g., presampled) and stored in an efficient manner. For example, the photon map is stored as an O-buffer or a uniform buffer. The O-buffer is adapted to the scan data and/or the transfer function to optimize the offset of the O-buffer for use in Monte-Carlo volume rendering. The sampled photon map may offset some of the additional computational cost of rendering based on the stored O-buffer or uniform buffer. Sampling the photon map may be performed offline (e.g., presampling) for use later during interactive rendering, reducing computational costs and increasing the speed of the interactive rendering.

In a first aspect, a method for generating a volume rendering is provided. The method includes receiving scan data of a volume and receiving a photon map for the volume. The photon map is generated from the scan data. The method also includes generating a volume rendering from the scan data and the photon map. Generating the volume rendering includes volumetric Monte-Carlo path tracing and photon map sampling.

In a second aspect, a method for presampling a photon map for Monte Carlo volume renderings is provided. The method includes receiving scan data for a volume, generating a photon map for indirect rays of the scan data, and storing the photon map as an O-buffer by non-uniformly sampling the photon map.

In a third aspect, a system for rendering a medical volume is provided. The system includes a scanner that is configured to capture scan data of a patient. A renderer is configured to receive the scan data of the patient from the scanner, to generate a photon map from the scan data, and to store the photon map in an O-buffer. The renderer is also configured to generate a volume rendering of the patient from the scan data and the O-buffer.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EXEMPLARY EMBODIMENTS

The present embodiments generate and utilize a presampled photon map (e.g., a precomputed photo map) to improve the global illumination accuracy of a Monte-Carlo volume rendering. Presampling the photon allows for integration of photon mapping into the Monte-Carlo volume rendering framework, and enables computationally expensive calculations to be performed offline (i.e., in advance). The presampled photon maps are used during an interactive volume rendering to improve the global lighting effects and to increase the speed of generating the volume renderings. Interactive volume renderings allow a user to manipulate the rendered image in real-time, such as via rotation, zoom and translation. Further, because a photon map is view-independent and the computationally expensive sampling is performed offline, the photons may be sampled quickly and efficiently during the interactive rendering, increasing the speed of the computations required for rendering the displayed image.

Figure 1:
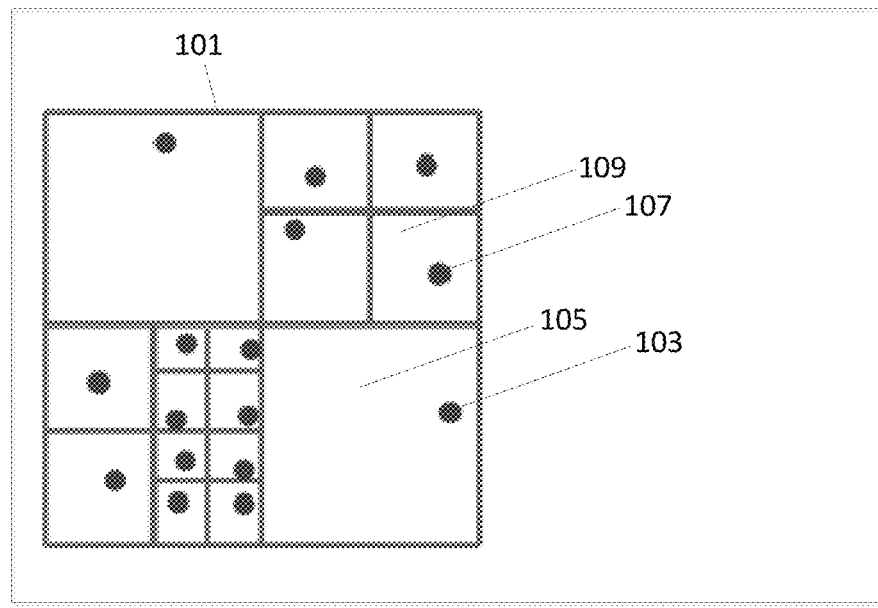
FIG. 1 illustrates an example of an adaptive O-buffer storing a photon map.

Presampling of the photon map utilizes an adaptive O-buffer to store the photon map efficiently. O-buffers render primitives like conventional volume renderings, but also allow for sampling at non-uniform locations. O-buffers store an offset to each sampling location determined by a grid of the volume. FIG. 1 illustrates an example of an adaptive O-buffer storing a photon map. The O-buffer 101 stores the direction and energy of photons hitting each position of the volume (e.g., such at position 103 of the volume). By storing the photon direction and energy with the offset values, the exact location and characteristics of each photon hitting the volume may be recorded.

Further, the O-buffer uses a GPU-based Oct-tree structures allowing the O-buffer to be adapted to the scan data and/or the transfer function during sampling. The scan data of a volume includes different physical measurements and characteristics of the volume. For example, for single-photon emission computed tomography (SPECT), emitted radiation is measured. For computed tomography (CT), attenuation is measured in Hounsfield units. The scan data may not map colors or other information. A transfer function is applied to the scan data to determine areas of the volume that are visible and invisible, and to apply color and transparency for rendering and displaying an image of the volume. For example, regions of the volume that are transparent, translucent or very homogeneous, due to the chosen transfer function applied to the scan data, may be sampled with a different number of photons in the photon map than for solid regions. Depending on the specified transfer function, the O-Buffer may be adapted to store fewer photons transparent regions of the volume. For solid regions of the volume, such as edges of the volume, the O-buffer may be adapted to store additional photons for accurate lighting.

For example, referring back to FIG. 1, homogenous regions, such as region 105, may be sampled with one or more photons, such as a single photon 103. Non-homogenous regions are divided into more, smaller regions, such as region 109, each with one or more photons, such as photon 107. As depicted in FIG. 1, non-transparent, non-translucent or non-homogeneous regions of the photon map are represented by more photons than transparent, translucent or very homogeneous. Thus, the different sized regions of the photon map are non-uniformly sampled to generate the non-uniform, adaptive O-buffer 101. The adaptive O-buffer 101 is stored for later use during Monte-Carlo volume rendering, and may be transmitted to another device for performing the volume rendering.

Figure 2:
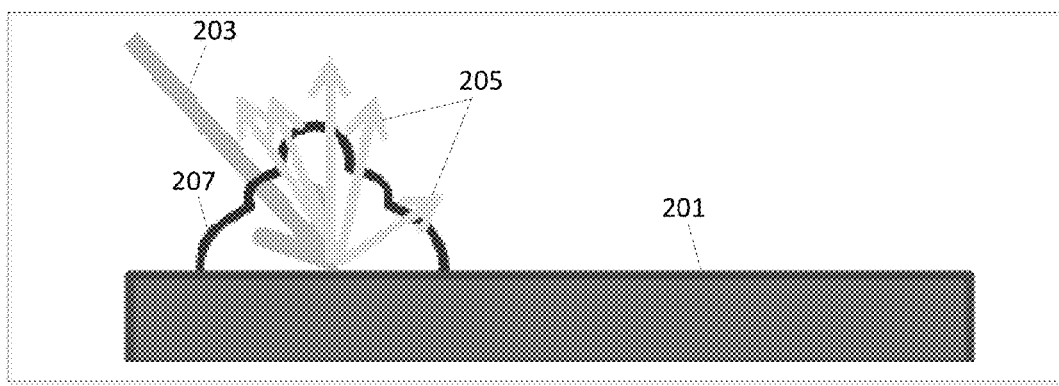
FIG. 2 illustrates an example of computing the lighting at a position of a volume.

The Monte-Carlo volume rendering is performed using the stored O-buffer. For example, when a global lighting computation is performed, the O-buffer is sampled to gather the stored photons for rendering. Using the stored photons, a bidirectional reflectance distribution function (BRDF) is applied to the stored photons to compute the global illumination contribution. FIG. 2 illustrates an example of computing the lighting at a position of a volume. For example, computing the lighting at a position of the volume 201 from the incoming photon 203 is depicted (e.g., stored as photon 103 in FIG. 1). The BRDF 207 is applied to the incoming photon 203 to calculate the reflected light 205 according to the BRDF. During sampling, a number of photons with the smallest distance to the point where the lighting is evaluated are integrated with the BRDF. The BRDF computation is performed using the incoming direction stored with each photon in the photon map. For example, Monte-Carlo path tracing is used for the primary or direct light contribution (e.g., rays from the light source) and the photon map is used for the secondary or indirect light contribution (e.g., rays from the viewpoint of the rendering or camera lens) using the BRDF. The O-buffer may be used to expedite the rendering computations at the expense of resolution (e.g., lower image quality).

Figure 3:
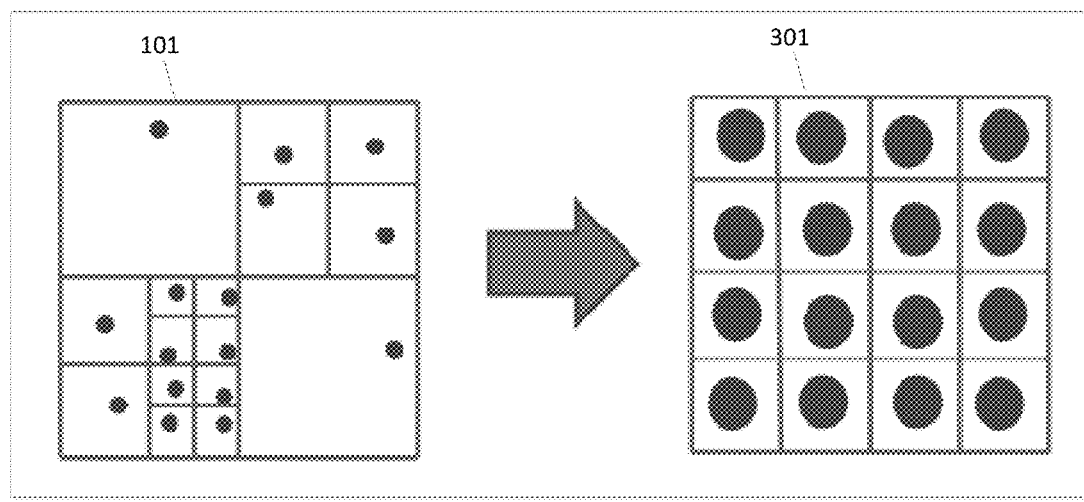
FIG. 3 illustrates an example of sampling an O-buffer to generate a uniform buffer.

To further accelerate the rendering computations, the photon map or adaptive O-buffer may be sampled or resampled to generate a uniform buffer. FIG. 3 illustrates an example of sampling an O-buffer 101 to generate a uniform buffer. For example, the adaptive O-buffer 101 is presampled into a uniform buffer 301 according to a uniform grid. The uniform buffer 301 may be used for more efficient evaluation when comparted to the O-buffer and permits a further reduction in computational cost. The uniform buffer 301 may be used to further expedite the rendering computations at a further expense of resolution (e.g., lower image quality). In an example, the uniform buffer 301 is used during interactive rendering to generate a preview rendered image, while the O-buffer 101 is subsequently used to generate a higher resolution image. The O-buffer 101 and uniform buffer 301 may reduce the amount of memory required to store the photon map.

In another embodiment, an additional computation may be performed to further reduce the amount of memory required to store the photon map. Similar photons in the photon map are identified, or captured, for an averaging computation. For example, if two or more photons are identified as striking the volume in close proximity and at very similar angles (e.g., incoming angles differing by less than a predetermined threshold), the photons may be averaged to generate a single direction, position and energy to be stored as a single photon. Further, a weighted average may be applied to the similar photons. A reduction in the memory required to store the photon map and a reduction in computational cost of rendering may be achieved with the tradeoff of a lower resolution of the photon map and the rendered image.

Figure 4:
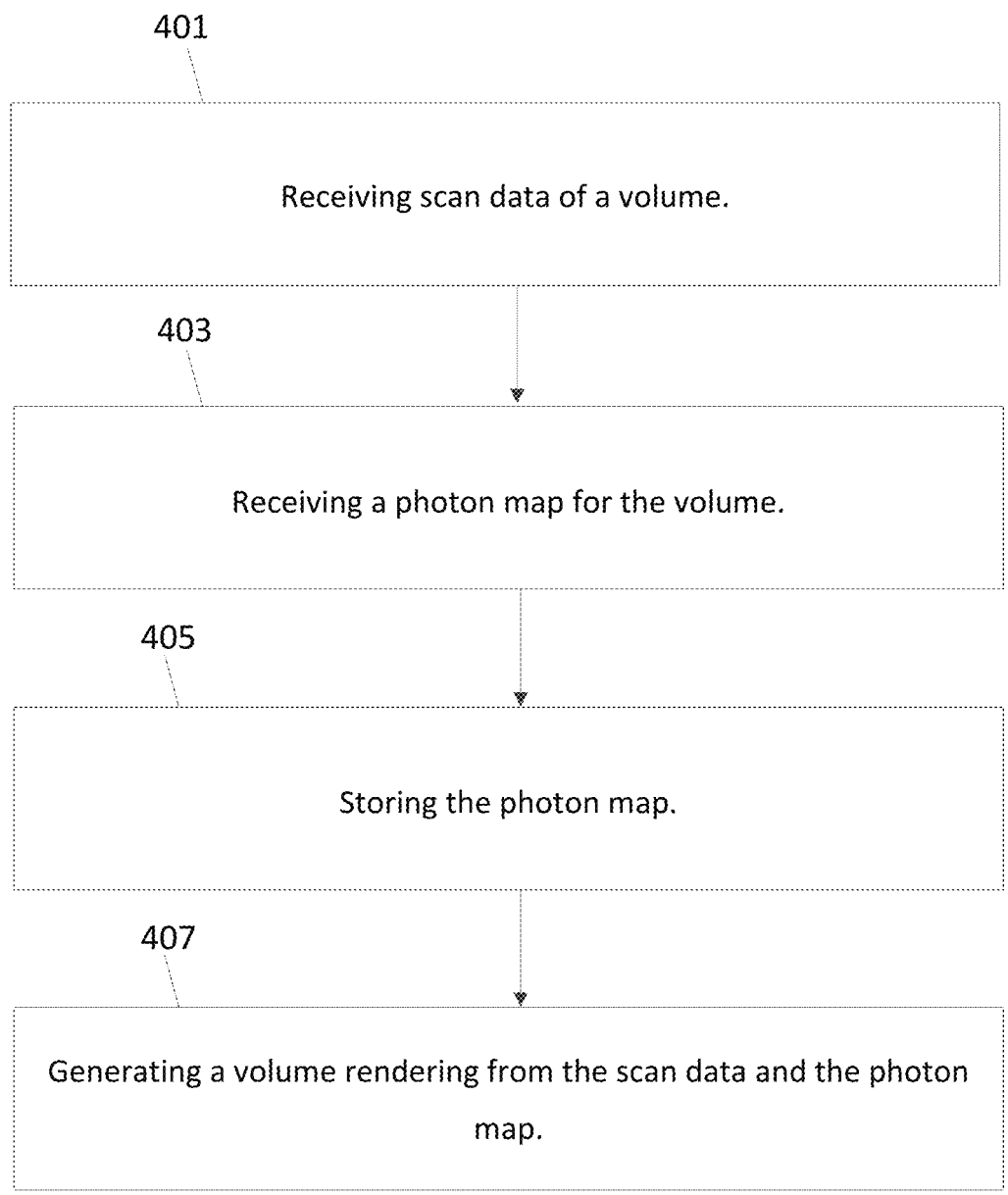
FIG. 4 illustrates a flowchart diagram of an embodiment of a method for generating a volume rendering.

FIG. 4 illustrates a flowchart diagram of an embodiment of a method for generating a volume rendering. The method is implemented by the system of FIG. 6 (discussed below) and/or a different system. Additional, different or fewer acts may be provided. For example, act 405 may be omitted. The method is provided in the order shown. Other orders may be provided and/or acts may be repeated. For example, act 407 may be repeated to generate volume renderings from different viewpoints or perspectives. Further, the acts may be performed concurrently as parallel acts. For example, acts 401 and 403 may be performed concurrently.

At act 401, an image processor receives scan data of a volume (e.g., image data). The volume is any three-dimensional volume. For example, the volume is a medical volume, such as a patient. At act 403, the image processor receives a photon map for the volume. For example, the photon map is generated from the scan data. Alternatively, the image processor generates the photon map using the received scan data. The photon map is generated by emitting photons from the light source and storing the interaction of the photons in a tree structure. The emitted photons interact with the geometry of the volume until the photons are lost (i.e., no longer interact with the volume) or are absorbed. The interaction of the photons with the volume are determined probabilistically and depend on the material properties of the volume and/or another surface. The absorbed photons are then stored in a tree structure to generate the photon map.

At act 405, the image processor stores the photon map. For example, the photon map is sampled and stored as a non-uniform and/or adaptive O-buffer. A non-uniform adaptive O-buffer is adapted to the scan data and/or a transfer function by storing fewer photons for transparent, translucent, homogenous or other regions of the volume based on the scan data and/or the transfer function. Alternatively, the photon map is sampled stored as a non-uniform O-buffer and as a uniform buffer. The uniform buffer stores fewer (e.g., one photon) for each of a plurality of uniformly sized grid locations of the buffer.

At act 407, a renderer generates a volume rendering from the scan data and the photon map. For example, the volume rendering is generated using volumetric Monte-Carlo path tracing and photon map sampling. The renderer uses Monte-Carlo path tracing with the scan data to render direct light contribution of the rendering and samples the photon map to render the indirect light contribution using a bidirectional reflectance distribution function. The direct light contributes primary rays from a light source, and the indirect light contributes secondary rays from a viewpoint or perspective of the rendering (e.g., a simulated camera lens).

In an implementation, the renderer performs an interactive volume rendering using a non-uniform O-buffer and a uniform buffer. For example, the volume is rendered at a first resolution using the uniform buffer (e.g., to generate a preview image) and at a second resolution using the adaptive O-buffer (e.g., to generate the interactive volume rendering at a higher resolution than the preview). Further, because the photon map is view-independent, the interactive rendering may be modified in real-time by the user to change the viewpoint or perspective of the rendered image.

Figure 5:
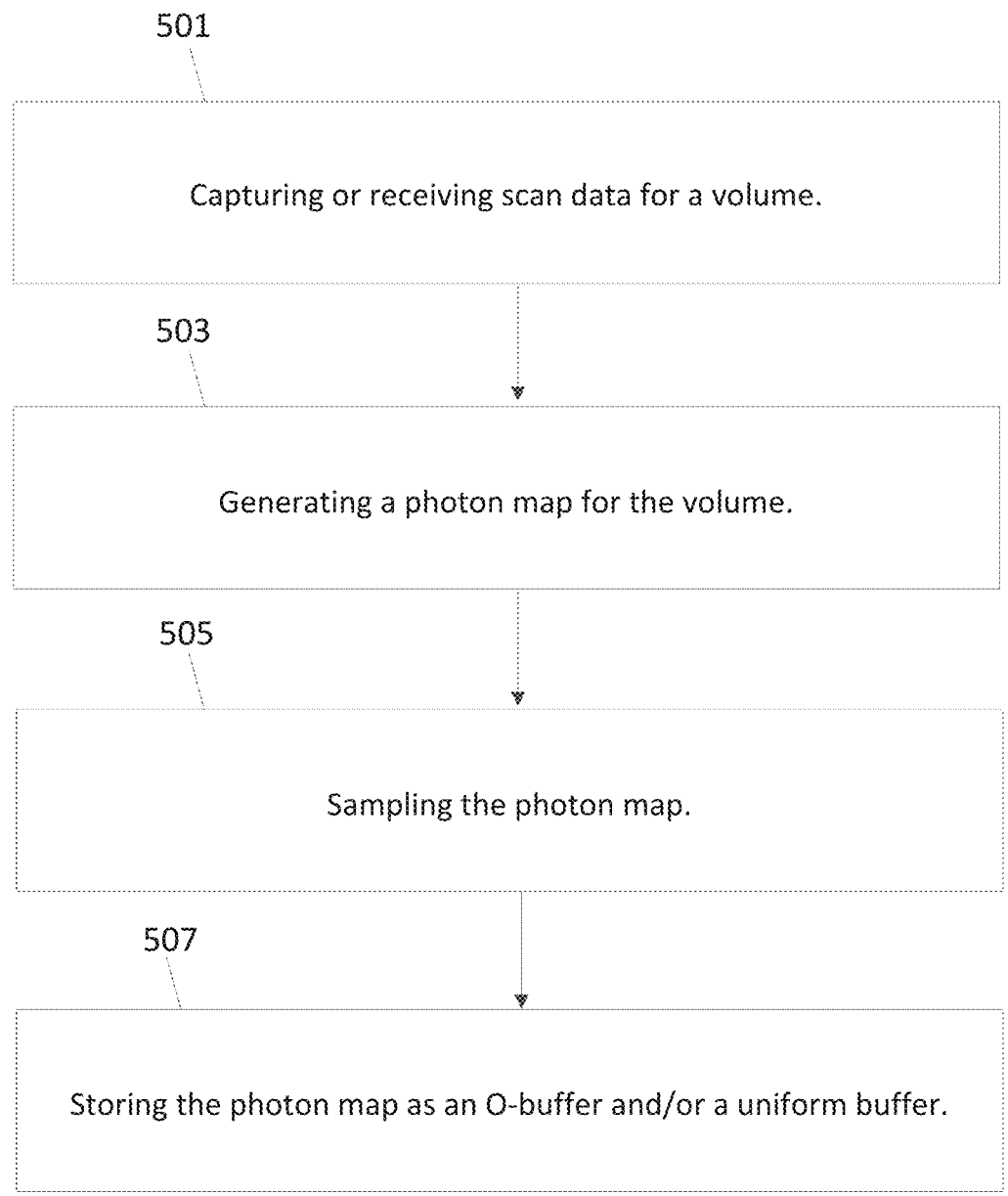
FIG. 5 illustrates a flowchart diagram of an embodiment of a method for sampling a photon map for generating a volume rendering.

FIG. 5 illustrates a flowchart diagram of an embodiment of a method for sampling a photon map for generating a volume rendering. The method is implemented by the system of FIG. 6 (discussed below) and/or a different system. Additional, different or fewer acts may be provided. The method is provided in the order shown. Other orders may be provided and/or acts may be repeated. For example, act 505 and 507 may be repeated to sample and store additional photon maps. Further, the acts may be performed concurrently as parallel acts.

At act 501, scan data is captured or received for a volume. At act 503, a photon map is generated. For example, the photon map is generated for indirect rays of the scan data.

At act 505, the photon map is sampled. The photon map is sampled to generate a non-uniform O-buffer. The O-buffer may be adapted to the transfer function used to generate the photon map storing fewer photons for various regions of the photon map based on the scan data. In an implementation, the photon map is sampled after identifying and capturing a plurality of similar photons and storing the plurality of similar photons as a single photon (e.g., stored in the uniform map or buffer). For example, a plurality of photons nearest to a specified point (e.g., an intersection point in question) are determined. After the plurality of similar photons are identified and captured, a weight for each of the plurality of similar photons is determined to perform a weighted average for the photons. For example, a weighted average may be performed by applying a weight determined by the distance to the sample point, such that photons closer to the sample point have more weight than photons that are farther from the sample point. Other weighted averages or simple averaging techniques may also be used. After averaging the similar photons, a photon is stored representing the plurality of similar photons.

At act 507, the photon map is stored as a uniform buffer and/or a non-uniform O-buffer. For example, an offset to each sampling location of the volume, determined by a grid, is stored in an O-buffer. The O-buffer stores the direction and energy of photons hitting each sampling location of the volume. By storing the photon direction and energy at each offset location, the exact location and characteristics of each photon hitting the volume may be recorded. The O-buffer may be non-uniform by storing fewer photons in some regions (i.e., transparent regions based on the transfer function) and more photons in other areas (i.e., solid regions based on the transfer function). By using a non-uniform O-buffer, the photon map may be stored using less memory. The O-buffer may also be sampled to generate a uniform buffer. The uniform buffer may store fewer photons than the non-uniform O-buffer, such as by averaging stored photons from the O-buffer, to store the photon may with less memory than the O-buffer.

Figure 6:
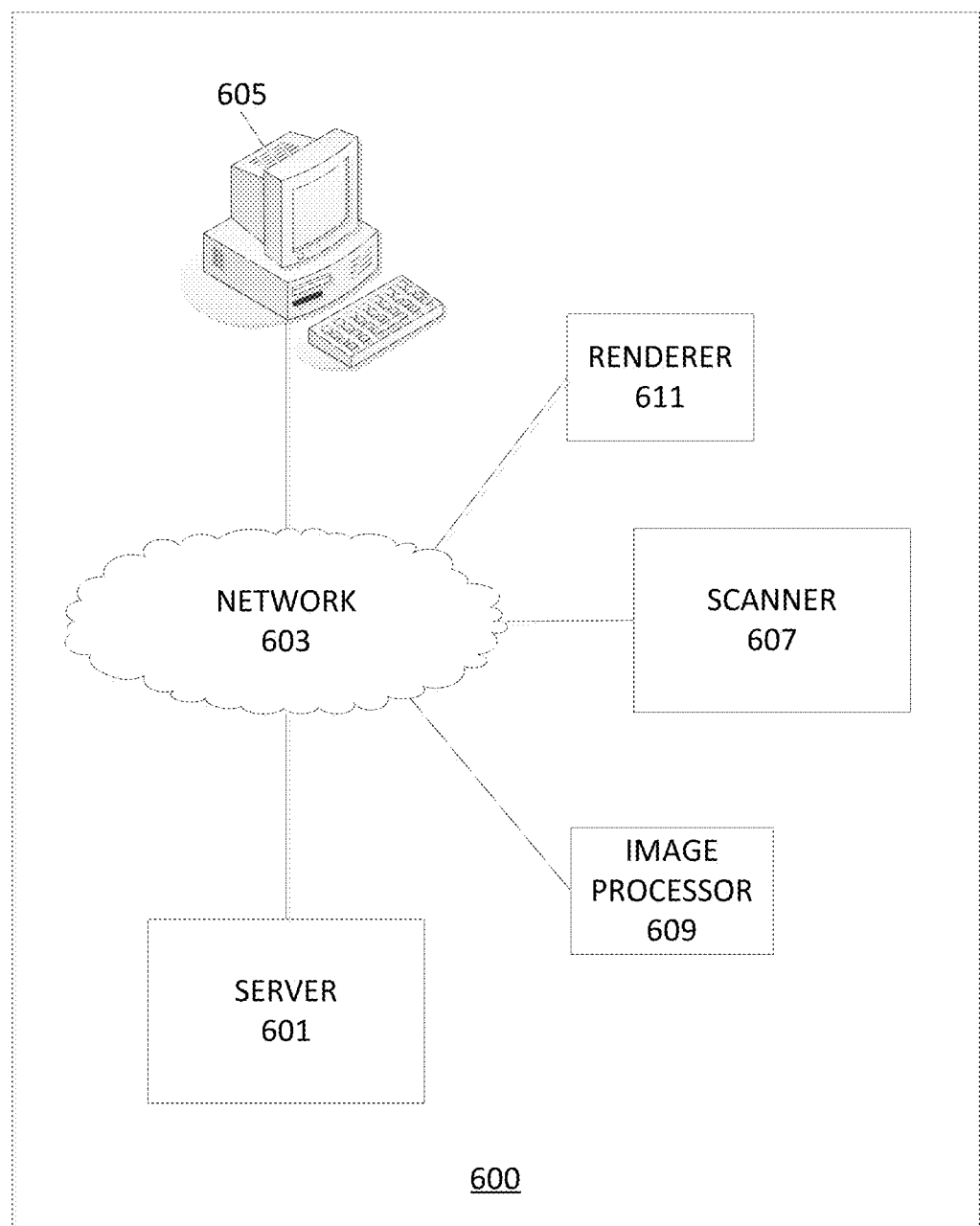
FIG. 6 illustrates an embodiment of a system for sampling a photon map and generating a volume rendering.

FIG. 6 illustrates an embodiment of a system for sampling a photon map and generating a volume rendering. The system 600, such as a medical system, may include one or more of a server 601, a network 603, a workstation 605 and a scanner 607. Additional, different, or fewer components may be provided. For example, additional servers 601, networks 603, workstations 605 and/or scanners 607 are used. In another example, the servers 601 and the workstation 605 are directly connected, or implemented on a single computing device. In yet another example, the server 601, the workstation 605 and the scanner 607 are implemented on a single scanning device. As another example, the workstation 605 is part of the scanner 607. In yet another embodiment, the scanner 607 performs the image data capture, photon mapping and rendering without use of the network 603, server 601, or workstation 605.

The scanner 607 is configured to capture scan data of a patient or another volume. The scanner 607 is a three-dimensional scanner, such as a computerized tomography (CT), ultrasound, x-ray, or magnetic resonance (MR) scanner. Other scanners may be used.

The network 603 is a wired or wireless network, or a combination thereof. Network 603 is configured as a local area network (LAN), wide area network (WAN), intranet, Internet or other now known or later developed network configurations. Any network or combination of networks for communicating between the client computer 605, the scanner 607, the server 601 and other components may be used.

The server 601 and/or workstation 605 is a computer platform having hardware such as one or more central processing units (CPU), a system memory, a random access memory (RAM) and input/output (I/O) interface(s). The server 601 and workstation 605 also includes a graphics processor unit (GPU) to accelerate image rendering. The server 601 and workstation 605 is implemented on one or more server computers connected to network 603. Additional, different or fewer components may be provided. For example, an image processor 609 and/or renderer 611 may be implemented (e.g., hardware and/or software) with one or more of the server 601, workstation 605, another computer or combination thereof.

The server 601 is configured to receive the scan data of the patient or other volume from the scanner. The server 601 is also configured to generate a photon map from the scan data. The server 601 is further configured to store the photon map. For example, the photon map is stored as an O-buffer. The O-buffer is an adaptive O-buffer for storing the photon map by adapting the O-buffer to the scan data and/or a transfer function for the scan data. Adapting the O-buffer the transfer function includes storing homogenous regions of the photon map, based on the scan data and/or the transfer function, with fewer photons in transparent, translucent or homogenous regions than in other regions, such as non-homogenous regions. Alternatively or additionally, the photon map and/or the O-buffer may be sampled to generate a uniform buffer.

The workstation 605 may be configured to receive the scan data and the photon map from the server 601 over the network 603. The photon map is stored an O-buffer and/or a uniform buffer. The workstation 605 also generates a volume rendering of the patient or other volume from the scan data and the photon map (e.g., by executing an application). For example, generating the volume rendering includes volumetric Monte-Carlo path tracing on the scan data for primary rays of the scan data and sampling the photon map for secondary rays of the scan data, such as by applying a bidirectional reflectance distribution function.

Other functions may be used. In an implementation, the volume rendering is generated interactively based on a user input by a graphical user interface for the workstation 605. For example, the graphical user interface may include one or more buttons, a keypad, a keyboard, a mouse, a stylist pen, a trackball, a rocker switch, a touch pad, voice recognition circuit, or another device or component for inputting data. In an example, a touch screen with pinch to zoom is used on a mobile device or workstation. Alternatively, the server 601 may be configured to generate a volume rendering of the patient or other volume from the scan data and the photon map (e.g., by executing an application). The server 601 then provides the rendered image to the workstation 605 for display. In another alternative, the workstation 605 is configured to the scan data of the patient or other volume from the scanner to generate a photon map from the scan data and to store the photon map without a server 601. The workstation 605 may also display the rendered image to the user.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

We claim:

1. A method for generating a volume rendering, the method comprising:
    receiving scan data of a volume;
    receiving a photon map for the volume, the photon map generated from the scan data according to non-uniformly sampled interactions between incoming photons and the volume, wherein a light source emits the incoming photons onto the volume and the incoming photons reflect off the volume, and wherein the interactions between the incoming photons and the volume depend on at least one material property of the volume, the photons of the photon map stored in an O-buffer;
    presampling the photon map of the O-buffer to a regular grid, the photons of the regular grid being stored in a uniform buffer due to the presampling; and
    generating an interactive volume rendering from the scan data and the photons of the regular grid in the uniform buffer, wherein generating the interactive volume rendering comprises volumetric rendering based on the photons of the regular grid in the uniform buffer.

2. The method of claim 1 wherein Monte-Carlo path tracing is configured to render direct light from the scan data and to render indirect light using a bidirectional reflectance distribution function.

3. The method of claim 2, wherein the direct light comprises primary rays from a direct light source and the indirect light comprises secondary rays from an indirect light source comprising a viewpoint of the rendering.

4. The method of claim 1, wherein the photons of the received photon map are stored in the O-buffer as a non-uniform O-buffer.

5. The method of claim 4, wherein the non-uniform O-buffer is adapted to a transfer function.

6. The method of claim 5 wherein the adapted O-buffer stores fewer photons for a transparent or homogenous region of the volume based on the transfer function.

7. The method of claim 1, wherein the interactive volume rendering is configured to allow a user to manipulate the rendered image in real-time.

8. The method of claim 1, wherein generating the interactive volume rendering comprises:
    generating a first volume rendering with the interactive volume rendering at a first resolution using the photons of the uniform buffer; and
    generating a second volume rendering at a second resolution using the photons of the O-buffer, wherein the second resolution is greater than the first resolution, the O-buffer being an adaptive O-buffer.

9. A method for presampling a photon map for Monte Carlo volume renderings, the method comprising:
    receiving, from a scanner, scan data for a volume;
    generating, by an image processor, a photon map for indirect rays of the scan data, wherein the photon map is generated according to non-uniformly sampled interactions between incoming photons and the volume, wherein a light source emits the incoming photons onto the volume and the incoming photons reflect off the volume, and wherein the interactions between the incoming photons and the volume depend on at least one material property of the volume, the photons of the photon map stored in an O-buffer;
    presampling, by the image processor, the photon map of the O-buffer to a regular grid, the presampling storing photons of the photon map in a uniform buffer with a regular grid; and
    storing, in a memory, the uniform buffer for generating an interactive volume rendering.

10. The method of claim 9, wherein the O-buffer is adapted to a transfer function used for generating the interactive volume rendering.

11. The method of claim 10, wherein adapting the O-buffer comprises storing fewer photons for transparent or homogenous regions of the photon map.

12. The method of claim 9, wherein the O-buffer is adapted to the scan data by storing fewer photons for transparent or homogenous regions of the volume.

13. The method of claim 9, wherein presampling the photon map comprises:
    identifying a plurality of similar photons; and
    storing the plurality of similar photons as a single photon in the uniform buffer.

14. The method of claim 13, wherein identifying the plurality of photons comprises:
    determining which of the photons in the photon map are the plurality of similar photons; and
    determining a weight for each of the plurality of similar photons.

15. A system for rendering a medical volume, the system comprising:
    a scanner configured to:
        capture scan data of a patient; and
    an image processor configured to:
        receive, from the scanner, the scan data of the patient;
        generate a photon map from the scan data according to non-uniformly sampled interactions between incoming photons and the volume, wherein a light source emits the incoming photons onto the volume and the incoming photons reflect off the volume, and wherein the interactions between the incoming photons and the volume depend on at least one material property of the volume, the photons of the photon map stored in an O-buffer;
        presample the photon map of the O-buffer to a regular grid, the photons of the regular grid being stored in a uniform buffer due to the presampling;
        store the photons of the uniform buffer; and generate an interactive volume rendering of the patient from the scan data and the photons of the uniform buffer.

16. The system of claim 15, wherein generating the interactive volume rendering comprises:
   performing volumetric Monte-Carlo path tracing on the scan data for primary rays of the scan data; and
   applying a bidirectional reflectance distribution function by sampling the photon map for secondary rays of the scan data.

17. The system of claim 15, wherein storing comprises adapting the storage to a transfer function for the scan data.

18. The system of claim 17, wherein adapting the storage to the transfer function comprises storing homogenous regions of the photon map, based on the transfer function, with fewer photons than non-homogenous regions.

\* \* \* \* \*